UNITED STATES PATENT OFFICE.

ALEXANDER H. EVERETT, OF SAN FRANCISCO, CALIFORNIA.

IMPROVEMENT IN PROCESSES OF REFINING AND PURIFYING LEAD.

Specification forming part of Letters Patent No. 152,987, dated July 14, 1874; application filed June 3, 1874.

*To all whom it may concern:*

Be it known that I, ALEXANDER H. EVERETT, of San Francisco city and county, State of California, have invented a Process for Refining and Purifying Lead; and I do hereby declare the following description is sufficient to enable any person skilled in the art or science to which it most nearly appertains to make and use my said invention without further invention or experiment.

My invention relates to a novel process for separating zinc impurities from lead which has been separated from silver by the use of zinc.

It is well known that where silver has been removed from lead by the use of zinc, more or less of the zinc remains with the lead, rendering it hard, and a subsequent process is necessary to produce soft commercial lead.

To facilitate the removal of zinc and produce a soft and superior quality of commercial lead, I employ dry chlorine gas, passing the gas through the melted lead, where it unites with the zinc, forming chloride of zinc, which immediately rises to the surface of the melted metal, and from which it is easily removed by the addition of a little slaked lime or ashes (which serves to thicken the chloride of zinc) by the use of a skimmer.

I do not confine myself to any particular form of apparatus for accomplishing this end, as it is equally applicable to the common reverberatory calcining-furnace as to the ordinary melting-pot of the refiner. All that is necessary is to have a pan or kettle so set that the lead to be refined can be melted and maintained at a temperature proper for the purpose. A little below the melting-point of zinc is generally sufficient, if care is taken to have the melted metal agitated, in order to insure the complete distribution of the gas through the entire mass.

Any of the ordinary generators of chlorine can be employed, and it is prudent, though not absolutely necessary, to dry the gas before passing it into the melted metal. This can be accomplished by passing the gas over fused chloride of calcium.

I am aware that chlorine gas has been employed for the purpose of separating silver from gold; but

What I claim as new, and desire to secure by Letters Patent, is—

The process of separating zinc from lead, and for producing soft commercial lead from hard and unrefined lead, the same consisting in the introduction of chlorine gas into the melted metal, thus converting the zinc into a chloride, substantially as herein described.

In witness whereof I hereunto set my hand and seal.

ALEXANDER H. EVERETT. [L. S.]

Witnesses:
GEO. H. STRONG,
C. M. RICHARDSON.